Aug. 4, 1964

E. A. MILLER 3,143,684

COMPOSITE METALLIC ELECTRODE MATERIAL
AND ELECTRODES MADE THEREFROM

Filed Oct. 27, 1959

Inventor,
Edwin A. Miller,
by [signature]
Att'y.

United States Patent Office 3,143,684
Patented Aug. 4, 1964

3,143,684

COMPOSITE METALLIC ELECTRODE MATERIAL AND ELECTRODES MADE THEREFROM

Edwin A. Miller, Attleboro, Mass., assignor to Texas Instruments Incorporated, Dallas, Tex., a corporation of Delaware Filed Oct. 27, 1959, Ser. No. 848,939
15 Claims. (Cl. 313—355)

The instant invention relates to new and unique composite strip materials which are particularly useful in electrical and electronic component applications. The unique composite materials of the instant invention are particularly useful as anode materials for electronic tubes.

It is one object of the instant invention to provide composite materials which are of high electrical conductivity and which exhibit markedly improvide tensile characteristics.

It is another object of the instant invention to provide new and improved composite materials which afford substantially uniform heat distribution over their entire area and which, when employed as an anode of an electronic tube, afford a substantial reduction of the hot area operating temperature of the anode.

It is yet another object of the instant invention to provide new and improved materials which, when employed as an anode of an electronic tube, exhibit markedly improved gas evolution characteristics when heated in a vacuum.

It is yet another object of the instant invention to provide new and improved composite materials having improved thermal radiation and thermal emission properties and which are substantially free of undesirable inherent thermal deflection characteristics.

It is yet another object of the instant invention to provide new and improved composite materials which, when employed as anode material in an electronic tube, afford substantially reduced plate operating temperature; afford a reduced temperature differential between the hot and cool portions of the anode in operation; afford a reduction in temperature of the hot portion of the anode in operation; and which afford an increased power output life of the electronic tube.

It is yet another object of the instant invention to provide new and improved composite materials which are highly emissive, exhibit improved, thermal radiation and conduction characteristics; which are useful as material for heat dissipating members in such diverse applications as, for example, transistor or semiconductor clips, heat shields for receiving tubes and semiconductor devices, enclosures for semi-conductor devices, and radiators for electronic devices.

Other objects will be in part apparent and in part pointed out hereinafter.

The invention accordingly comprises the elements and combinations of elements, features of construction, and arrangements of parts which will be exemplified in the structures, methods and articles hereinafter described, and the scope of the application of which will be indicated in the following claims.

In the accompanying drawings, in which several of various possible embodiments of the invention are illustrated:

Figures 1, 2, 3:
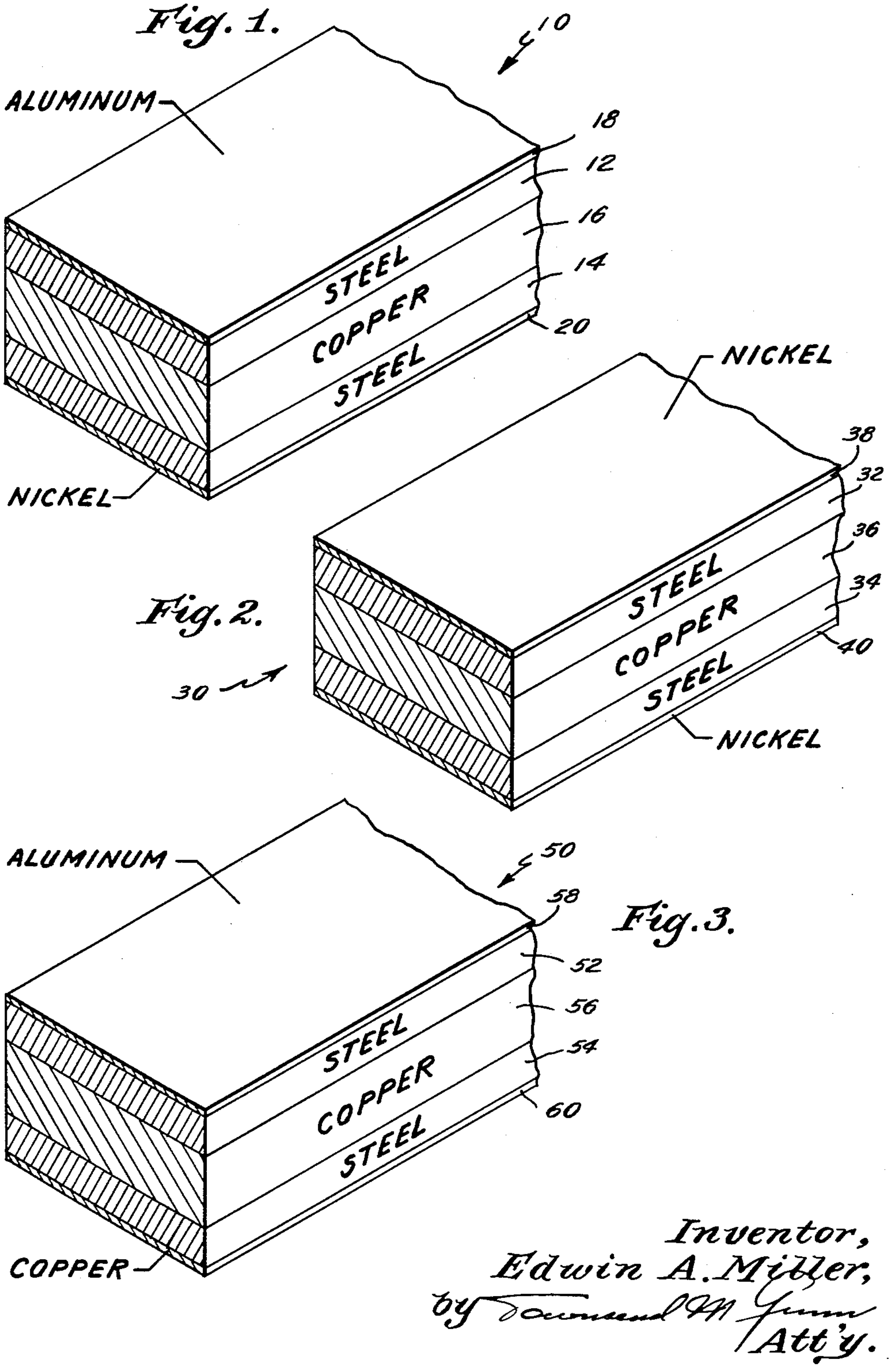
FIG. 1 illustrates a five-layered composite material according to a first embodiment of the instant invention.
FIG. 2 illustrates a five-layered composite material according to a second embodiment of the instant invention.
FIG. 3 illustrates a five-layered composite material according to a third embodiment of the instant invention.

Recent trends in the receiving tube art, particularly for amplifier tubes, have resulted in increased requirements for further miniaturization of these tubes along with increased electrical performance. Such increased requirements have created problems, among which one of the most significant is that of temperature, particularly that of the anode, since it is this component of the tube wherein most of the heat therein is generated. Since the anode is also required to re-radiate heat generated by other components of the tube, it is important that the anode does not operate at an excessively high temperature. Excessively high anode temperature can cause excessive grid and cathode temperatures and result in the development of excessive grid emission during the operating life of the tube. Further, such excessive temperature, and particularly "hot spots" or localized areas of heat generation on the anode, can create excessive gas evolution from the anode which can considerably reduce the power output life of the tube.

The anode generally does not operate at uniform temperatures over its entire area because of its peculiar geometric configuration and localized areas of heat generation. As mentioned above, these "hot spots" or localized areas of heat generation create most of the gas evolution from the anode and cause temperature increase of other components of the tube. Several attempts have been made to reduce the temperature of the anode such as, for example, incorporating radiating fins and increasing the radiation area of the anode. Increasing the radiation area of the anode will tend to increase the size of the tube rather than afford desired further miniaturization. As will be described in greater detail below, by providing an anode formed of the five-layered composite materials of the instant invention, a more effective use of the radiation area of the anode is afforded along with reduction of the "hot spot" or hot area temperature.

It has been discovered that an anode formed of the five-layered composite materials of the instant invention to be described below will successfully solve the above-mentioned problems and will provide a number of unique and unobvious advantages.

Referring now to FIG. 1 of the drawing, there is illustrated a five-layered composite material generally referred to by numeral 10, according to a first embodiment of the instant invention. Composite material 10 comprises two layers of steel 12, 14, each adhered or bonded to and sandwiching therebetween, a layer of copper 16, a layer of aluminum 18, adhered or bonded to steel layer 12 and a layer of nickel 20 adhered or bonded to steel layer 14. The five-layered composite strip described above and shown in FIG. 1, as well as the five-layered composite materials 30 and 50 shown in FIGS. 2 and 3, may be bonded by the method set forth in detail in the patent to Boessenkool et al. 2,691,815, granted October 19, 1954.

It is preferred, though not absolutely essential, that the aluminum layer 18 be an aluminum alloy which includes 1.0% to 1.5% silicon, the steel layers 12 and 14 be a low carbon steel (0.08% carbon maximum) and that the copper layer 16 be an OF (oxygen-free copper). The OF or oxygen-free copper is preferred to any of the presently known deoxidized coppers, so as to cooperate with the other component layers to provide a composite material with maximum electrical and thermal conductivity and low residual gas content. The low carbon steel is particularly advantageous in permitting the material to be annealed to provide the required ductility or spring-back characteristics necessary for forming components (e.g. anodes for electronic tubes) without causing conversion of the aluminum-steel layers 18–12 to form $FeAl_3$. The aluminum surface layer 18 will combine or react with the adjacent steel layer 12 by alitation, when the material is employed as an anode in an electronic tube, during the final firing of the tube to form an alitized dark grey surface layer of very high thermal emissivity.

The composite material 10 has versatile application as anode material for various types of electronic tubes. For example, in those applications, e.g. rectifier tubes, where there is a possibility of sublimation of the aluminum layer, which could cause shorting out of the tube, the anode would be arranged so that the outer nickel layer 20 would be adjacent the cathode. The composite material 10 through co-operation with the exterior nickel layer 20 in the aforementioned arrangement advantageously provides a relatively low thermal radiating surface. Where it is desired that both the outer layers, namely, the aluminum layer 18 and the nickel layer 20 have highly thermally emissive surfaces, the nickel layer can be carbonized.

The four materials which constitute the composite strip 10, as well as that of composite materials 30 and 50 to be described below, namely, aluminum, steel, copper and nickel have different coefficients of thermal expansion. Ordinarily, if the composite strip were of asymmetrical construction, this could give rise to thermal deflection or a curvature of the composite material which would be induced by heating.

Since composite material 10, as well as materials 30 and 50 to be described below, are substantially symmetrical in cross sectional construction with regard to thermal expansion of the respective layers, the problem of undesirable inherent thermal deflection is advantageously obviated or at least minimized.

Referring now to FIG. 2 of the drawings, there is illustrated a five-layered composite material generally referred to by numeral 30, according to a second embodiment of the instant invention. Composite material 30 comprises two layers of steel 32, 34, each adhered or bonded to and sandwiching therebetween a layer of copper 36, and two layers of nickel 38, 40, each adhered or bonded to steel layers 32 and 34, as shown. The steel layers 32 and 34 and copper layer 36 may be substantially the same as steel layers 12, 14 and copper layer 16 of composite material 10 described above.

Composite material 30 affords substantially all of the advantages of composite material 10 described above, and additionally provides a material which has greater applicability as anode material in a greater variety of electronic tube types than that of composite material 10. Composite material 30 is particularly advantageous as anode material in those tube types where aluminum sublimation poses a problem such as that described above. The nickel layers 38 and 40 can be carbonized if desired to provide a highly thermally emissive or thermally radiating surface. Thus, nickel layer 38, as well as aluminum layer 18 of composite material 10, can be converted to provide a highly thermally emissive surface. Additionally, each of nickel layer 38 and aluminum layer 18 is relatively gas free and corrosion resistant and has low vapor pressure characteristics, which features co-operate with the other components of the respective composite materials to afford a composite material having the many desirable and unique improved characteristics described above, and to be further described below.

Referring now to FIG. 3 of the drawings, there is illustrated a five-layered composite material generally referred to by numeral 50, according to a third embodiment of the instant invention. Composite material 50 comprises two layers of steel 52 and 54 each adhered or bonded to and sandwiching therebetween a layer of copper 56, a layer of aluminum 58 adhered or bonded to steel layer 52 and a layer of copper 60 adhered or bonded to steel layer 54. Aluminum layer 58, steel layers 52, 54 and copper layer 56 may be substantially the same as aluminum layer 18, steel layers 12, 14 and copper layer 16 of composite material 10 described above. It is preferred that copper layer 60 be also of oxygen-free copper, so as to co-operate with the other component layers to provide a composite material with maximum electrical and thermal conductivity and a low residual gas content.

Composite material 50 affords substantially all of the advantages of composite materials 10 and 30 and additionally provides a material which has increased thermal and electrical conduction and affords a greater, substantially uniform heat distribution than that afforded by composite materials 10 and 30. The copper layer 60 of composite material 50 and the nickel layers 20 and 40 of composite materials 10 and 30, respectively each afford bright surfaces of relatively low thermal radiation, as well as being substantially gas free and highly electrically conducting. Each of composite materials 10, 30 and 50 is particularly advantageous as anode material for those tubes where it is desired to have one outer surface with a high thermal emissivity and the other outer surface with a low thermal emissivity or with low thermal radiation characteristics. Composite material 50 is also particularly advantageous as anode material where aluminum sublimation poses a problem.

An anode formed of the five-layered composite materials 10, 30 and 50 of the instant invention affords a number of advantages not available with conventional anode materials, which advantages include:

(1) Substantially reduced temperature differential between the hot and cool portions of the tube and also some reduction in temperature of the hot portion, which affords a more uniform and a greater amount of total surface emission so as to advantageously reduce back emission, and which also serves to reduce ambient temperature and filament burnout, and thus afford a longer power output life of the tube;

(2) A greater uniform temperature distribution over the entire area of the anode which advantageously affords faster and more complete outgassing;

(3) A greater uniform temperature distribution over the entire area of the anode with no deleterious effects on thermal radiation properties;

(4) Substantially no undesirable inherent thermal deflection characteristics; and (5) The relatively low overall gas content of materials 10, 30 and 50 advantageously facilitates quicker and more complete outgasing of the anode and affords less gas evolution during the operating life of the tube.

The composite strips 10, 30 and 50 may be made in varying thicknesses. For example, the composite strips may be made in thicknesses as little as .005″ and in thicknesses on up through .007″, .010″ and greater in overall thickness.

The following table lists representative component thickness ranges for composite materials 10, 30 and 50 at .005″, .007″ and .010″ overall thicknesses with particular exemplary cross-sectional percentages of copper. The dimensions and percentages as set forth in the table are exemplary for the purpose of description and not of limitation.

*Exemplary Component Thickness Ranges*

COMPOSITE MATERIAL 10

| | .005″ (30% Cu) | .007″ (10% Cu) | .010″ (35% to 65% Cu) |
|---|---|---|---|
| Al | .0003″–.0006″ | .0003″–.0008″ | .0003″–.0008″ |
| Steel | .0015″ (minimum) | .0017″ (minimum) | .0017″–.0025″ |
| Cu | .0013″–.0018″ | .0025″–.0032″ | .0035″–.0065″ |
| Steel | .001″ (minimum) | .001″ (minimum) | .001″–.0025″ |
| Ni | .0004″–.0006″ | .0004″–.0006″ | .0004″–.0006″ |

COMPOSITE MATERIAL 30

| | .005" (40% Cu) | .007" (50% Cu) | .010" (35% to 65% Cu) |
|---|---|---|---|
| Ni | .0004"–.0006" | .0004"–.0006" | .0004"–.0006" |
| Steel | .001" (minimum) | .00125" (minimum) | .00125"–.00275" |
| Cu | .0018"–.0022" | .0032"–.0039" | .0035"–.0065" |
| Steel | .001" (minimum) | .00125" (minimum) | .00125"–.00275" |
| Ni | .0004"–.0006" | .0004"–.0006" | .0004"–.0006" |

COMPOSITE MATERIAL 50

| | .005" (30% Cu) | .007" (40% Cu) | .010" (35% to 65% Cu) |
|---|---|---|---|
| Al | .0003"–.0006" | .0003"–.0008" | .0003"–.0008" |
| Steel | .0015" (minimum) | .0017" (minimum) | .0017"–.0025" |
| Cu | .0008"–.0010" | .0025"–.0032" | .0035"–.0065" |
| Steel | .001" (minimum) | .001" (minimum) | .001"–.0065" |
| Cu | .0004"–.0006" | .0004"–.0006" | .0004"–.0006" |

It should be understood that the composite materials of the instant invention have utility wherever a material having one or more of the following properties and characteristics exhibited by these materials is required:

(1) High thermal emission;

(2) High thermal radiation;

(3) High thrmal conductivity;

(4) Superior structural strength to withstand distortion at high operating temperatures;

(5) Ability to maintain a substantially constant dimension when subjected to high operating temperatures;

(6) Material of a low residual gas content; and (7) A material not subjected to undesirable inherent thermal deflection characteristics.

The many desirable, improved characteristics of the five-layered composite materials of the instant invention render this material particularly desirable for such uses as, for example, a heat dissipating clip for transistor or semiconductor devices, as heat shields for electronic tubes and semiconductor devices, also as enclosures for semiconductor devices and has beam plates in electronic tubes.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A five-layered composite electrode material having improved thermal emission, thermal conduction and thermal radiation properties comprising two layers of steel each metallurgically bonded to and sandwiching therebetween a layer of an electrically conductive material of high thermal conductivity, a first layer selected from the group consisting of aluminum and nickel metallurgically bonded to one of said layers of steel and a second layer selected from the group consisting of nickel and copper metallurgically bonded to the other of said layers of steel, said first layer being aluminum when said second layer is copper.

2. The composite electrode material as set forth in claim 1 and wherein said layers of said composite material are substantially symmetrical in cross section, whereby to substantially avoid undesirable inherent thermal deflection characteristics.

3. A five-layered composite electrode material comprising two layers of steel each metallurgically bonded to and sandwiching therebetween a layer of copper, a first layer selected from the group consisting of aluminum and nickel, metallurgically bonded to one of said layers of steel and a second layer selected from the group consisting of nickel and copper, metallurgically bonded to the other of said layers of steel, said first layer being aluminum when said second layer is copper.

4. The composite electrode material as set forth in claim 3 and wherein each of said layers of said composite material are substantially symmetrical in cross section, whereby to substantially avoid undesirable inherent thermal deflection characteristics.

5. The composite electrode material as set forth in claim 3 and wherein said sandwiched copper layer is substantially oxygen-free.

6. A five-layered composite electrode material comprising two layers of steel each metallurgically bonded to and sandwiching therebetween a layer of copper, a layer of aluminum metallurgically bonded to one of said layers of steel, and a layer of nickel metallurgically bonded to the other of said layers of steel.

7. A five-layered composite electrode material comprising two layers of steel each metallurgically bonded to and sandwiching therebetween a layer of copper, a layer of aluminum metallurgically bonded to one of said layers of steel, and a layer of copper metallurgically bonded to the other of said layers of steel.

8. A five-layered composite electrode material comprising two layers of steel each metallurgically bonded to and sandwiching therebetween a layer of copper, a layer of nickel metallurgically bonded to one of said layers of steel, and a layer of nickel metallurgically bonded to the other of said layers of steel.

9. The composite electrode material as set forth in claim 8 and wherein at least one of said layers of nickel is carbonized so as to provide said material with at least one highly thermally emissive outer surface.

10. An anode for an electronic tube, said anode being formed of a five-layered composite material having improved thermal emission, thermal conduction and thermal radiation properties comprising two layers of steel each metallurgically bonded to and sandwiching therebetween a layer of an electrically conductive material of high thermal conductivity, a first layer selected from the group consisting of aluminum and nickel metallurgically bonded to one of said layers of steel and a second layer selected from the group consisting of nickel and copper metallurgically bonded to the other of said layers of steel, said first layer being aluminum when said second layer is copper.

11. An anode for an electronic tube, said anode being formed of a five-layered composite material having improved thermal emission, thermal conduction and thermal radiation properties comprising two layers of steel each metallurgically bonded to and sandwiching therebetween a layer of copper, a first layer selected from the group consisting of aluminum and nickel metallurgically bonded to one of said layers of steel and a second layer selected from the group consisting of nickel and copper metallurgically bonded to the other of said layers of steel, said first layer being aluminum when said second layer is copper.

12. An anode for an electronic tube, said anode being formed of a five-layered composite material comprising two layers of steel each adhered to and sandwiching therebetween a layer of copper, a layer of aluminum adhered to one of said layers of steel, and a layer of nickel adhered to the other of said layers of steel.

13. An anode for an electronic tube, and anode being formed of a five-layered composite material comprising two layers of steel each metallurgically bonded to and sandwiching therebetween a layer of copper, a layer of aluminum metallurgically bonded to one of said layers of steel, and a layer of copper metallurgically bonded to the other of said layers of steel.

14. An anode for an electronic tube, said anode being formed of a five-layered composite material comprising two layers of steel each metallurgically bonded to and sandwiching therebetween a layer of copper, a layer of nickel metallurgically bonded to one of said layers of steel, and a layer of nickel metallurgically bonded to the other of said layers of steel.

15. A five-layered composite electrode material comprising two layers of steel solid-phase bonded to and sandwiching therebetween a layer of copper; a first exposed, external layer selected from the group consisting of aluminum and nickel solid-phase bonded to one of said steel layers and a second exposed, external layer selected from the group consisting of nickel and copper, solid-phase bonded to the other steel layer, said first exposed, external layer being aluminum when said second exposed, external layer is copper.

References Cited in the file of this patent

UNITED STATES PATENTS

| | | |
|---|---|---|
| 889,937 | Little | June 9, 1908 |
| 967,146 | Simpson | Aug. 9, 1910 |
| 1,010,942 | Monash | Dec. 5, 1911 |
| 1,589,905 | Schmierer | June 22, 1926 |
| 2,070,968 | Bull | Feb. 16, 1937 |
| 2,149,657 | Armstrong et al. | Mar. 7, 1939 |
| 2,310,002 | Van Geel et al. | Feb. 2, 1943 |
| 2,470,033 | Hensel | May 10, 1949 |
| 2,484,311 | Prakke | Oct. 11, 1949 |
| 2,683,835 | Freedman | July 13, 1954 |
| 2,725,617 | Sternberg | Dec. 6, 1955 |
| 2,904,717 | Kerstetter | Sept. 15, 1959 |
| 3,070,721 | Ferry et al. | Dec. 25, 1962 |

FOREIGN PATENTS

| | | |
|---|---|---|
| 475,187 | Canada | July 10, 1951 |
| 896,229 | Germany | Nov. 9, 1953 |